United States Patent
Eccles et al.

(10) Patent No.: US 11,475,476 B2
(45) Date of Patent: *Oct. 18, 2022

(54) ESTIMATION OF TRUE AUDIENCE SIZE FOR DIGITAL CONTENT

(71) Applicant: Pandora Media, Inc., Oakland, CA (US)

(72) Inventors: Jonathan Andrew Eccles, San Francisco, CA (US); Jacek Adam Krawczyk, San Francisco, CA (US); Matthew Nikolaus Boetger, San Francisco, CA (US)

(73) Assignee: Pandora Media, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/099,637

(22) Filed: Nov. 16, 2020

(65) Prior Publication Data

US 2021/0073852 A1 Mar. 11, 2021

Related U.S. Application Data

(60) Continuation of application No. 16/049,581, filed on Jul. 30, 2018, now Pat. No. 10,878,443, which is a
(Continued)

(51) Int. Cl.
*G06Q 30/00* (2012.01)
*G06Q 30/02* (2012.01)
*H04L 65/60* (2022.01)

(52) U.S. Cl.
CPC ..... *G06Q 30/0242* (2013.01); *G06Q 30/0269* (2013.01); *H04L 65/60* (2013.01)

(58) Field of Classification Search
None
See application file for complete search history.

(56) References Cited

U.S. PATENT DOCUMENTS

| 7,075,000 B2 | 7/2006 | Gang et al. |
| 7,102,067 B2 | 9/2006 | Gang et al. |

(Continued)

FOREIGN PATENT DOCUMENTS

| JP | 2012-118623 A | 6/2012 |
| KR | 10-2009-0092789 A | 9/2009 |
| WO | WO 2009/015105 A1 | 1/2009 |

OTHER PUBLICATIONS

PCT International Search Report and Written Opinion, PCT Application No. PCT/US2015/052699, dated Jan. 29, 2016, 12 pages.
(Continued)

*Primary Examiner* — Kambiz Abdi
*Assistant Examiner* — Christopher Stroud
(74) *Attorney, Agent, or Firm* — Fenwick & West LLP

(57) ABSTRACT

A content server system provides a client device with content, such as an audio stream. Using various techniques, an estimate is made of the actual size of an audience associated with the provided content, rather than assuming that the audience is limited to a single user of the client device. The estimate may be made by the content server system, the client device, or the content server system and the client device collectively. Using the estimate of actual size of the audience, the content server system can take actions appropriate for the audience, such as providing advertisements appropriate for the size of the audience and for the collective characteristics of the audience members. The estimate of the actual audience size additionally allows the content server system to be compensated more precisely for any advertisements provided to that audience.

20 Claims, 10 Drawing Sheets

Related U.S. Application Data division of application No. 14/500,804, filed on Sep. 29, 2014, now abandoned.

(56) References Cited

U.S. PATENT DOCUMENTS

| | | | |
|---|---|---|---|
| 8,577,392 B1 | 11/2013 | Pai et al. | |
| 2006/0031381 A1 | 2/2006 | Van Luijt et al. | |
| 2009/0025024 A1* | 1/2009 | Beser | H04H 60/66 |
| | | | 725/12 |
| 2009/0113316 A1 | 4/2009 | Palermo | |
| 2010/0063880 A1* | 3/2010 | Atsmon | G10L 15/1822 |
| | | | 705/14.53 |
| 2011/0004474 A1 | 1/2011 | Bansal et al. | |
| 2011/0280408 A1 | 11/2011 | Falcon | |
| 2011/0288917 A1 | 11/2011 | Wanek et al. | |
| 2013/0138422 A1 | 5/2013 | Daye et al. | |
| 2013/0308874 A1* | 11/2013 | Togashi | H04N 19/80 |
| | | | 382/264 |
| 2013/0312019 A1 | 11/2013 | McMillan | |
| 2014/0073236 A1 | 3/2014 | Iyer | |
| 2014/0337868 A1* | 11/2014 | Garza | H04N 21/4532 |
| | | | 725/12 |
| 2014/0379477 A1* | 12/2014 | Sheinfeld | G06Q 30/0251 |
| | | | 705/14.58 |

OTHER PUBLICATIONS

United States Office Action, U.S. Appl. No. 16/049,581, filed Apr. 17, 2020, 14 pages.
United States Office Action, U.S. Appl. No. 14/500,804, filed Mar. 28, 2018, 12 pages.
United States Office Action, U.S. Appl. No. 14/500,804, filed Oct. 31, 2017, 14 pages.

* cited by examiner

ESTIMATION OF TRUE AUDIENCE SIZE FOR DIGITAL CONTENT

CROSS-REFERENCE TO RELATED APPLICATIONS

This application is a continuation of U.S. application Ser. No. 16/049,581, filed Jul. 30, 2018, which is a divisional of co-pending U.S. application Ser. No. 14/500,804, filed Sep. 29, 2014, which is incorporated by reference in its entirety.

BACKGROUND

1. Field of Art

The present invention generally relates to the delivery of content and associated advertising, and more specifically, to ways of estimating the true size of an audience listening to or otherwise experiencing the digital content.

2. Background of the Invention

Providers of digital content may generate revenue by inserting advertisements into the digital content and receiving payment from advertisers according to a cost-per impression (CPM) payment model. For example, the providers may insert audio advertisements between songs in an audio content stream provided to client devices. For purposes of the CPM model, the traditional assumption is that there is only one audience member for each audio stream provided by the provider to a client device, and the advertisers therefore only credit the provider with a single impression each time that an advertisement is inserted into an audio stream.

In reality, however, many people may be listening to or otherwise experiencing a single audio stream. For example, at a social event such as a gathering of friends in a home, there will typically be multiple people within hearing distance of the sound output device playing the audio stream, e.g., within a room. Thus, due to the lack of ability to accurately estimate the true audience size for an audio stream, the audio provider is credited only for a single impression for an ad provided on the audio stream, even when there are multiple people listening. This leads to a significant loss of potential revenue for the audio providers. Additionally, without having a more accurate estimate of the size and composition of the audience, it is difficult to provide the advertisements or other content that are most appropriate for the audience as a whole.

SUMMARY

In one embodiment, a computer-implemented method comprises identifying a streaming client device receiving streamed audio; determining a number of inferred listeners that are listening to the streamed audio when output by the streaming client device, the inferred listeners being in addition to a user using of the streaming client device; including an advertisement in the streamed audio provided to the streaming client device; and logging an impression count responsive to the inclusion of the advertisement, the impression count reflecting the determined number of inferred listeners.

In one embodiment, a computer-implemented method performed by a client device comprises receiving streamed audio from a content server system; outputting the streamed audio; determining a number of inferred listeners that are listening to the streamed audio output by the client device, the inferred listeners being in addition to a user using the client device; and sending, to the content server system, an audience count that is based on the inferred number of listeners.

In one embodiment, a computer-readable storage medium comprises computer program instructions executable by a processor. The instructions comprise instructions for identifying a streaming client device receiving streamed audio; instructions for determining a number of inferred listeners that are listening to the streamed audio when output by the streaming client device, the inferred listeners being in addition to a user using of the streaming client device; instructions for including an advertisement in the streamed audio provided to the streaming client device; and instructions for logging an impression count responsive to the inclusion of the advertisement, the impression count reflecting the determined number of inferred listeners.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
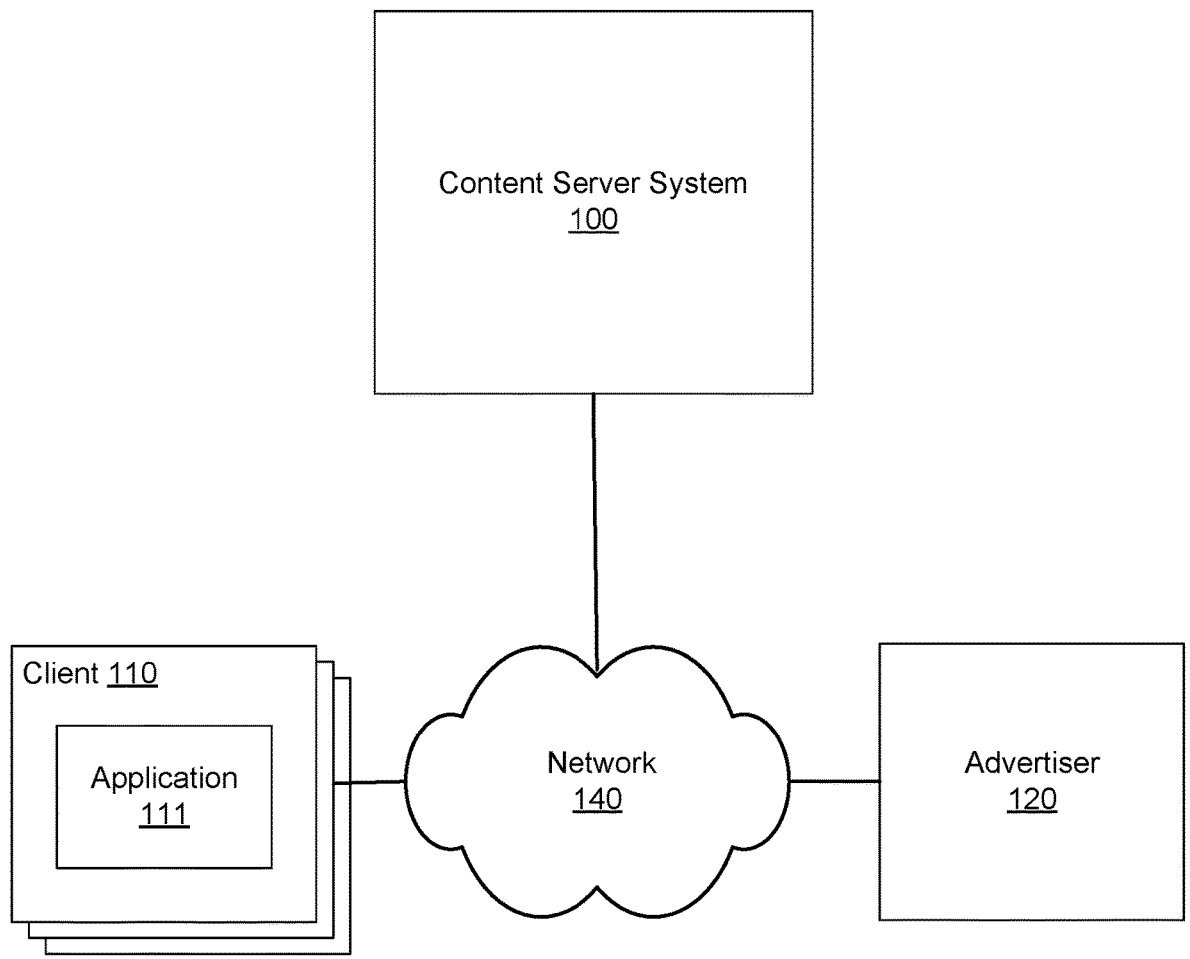
FIG. 1 illustrates a computing environment in which audio streaming and audience size estimation take place, according to one embodiment.

FIG. 1 illustrates a computing environment in which the content provision and audience size estimation take place, according to one embodiment. A content server system 100 provides digital content to client devices 110. The content server system 100 also inserts advertisements from one or more advertisers 120 into the content provided to the client devices 110, and is paid by the advertisers accordingly based on a cost per impression (CPM) payment model.

In one particular embodiment referred to throughout the remainder of the specification, the content server system 100 provides streamed audio content, such as songs, pieces of music, or audio recordings. It is appreciated, however, that in other embodiments the content server system 100 could alternatively and/or additionally provide other forms of digital content, such as videos, movies, slideshows, images, or non-streamed audio. Thus, subsequent references to "listening" or other audio-related terminology could equally apply to (for example) viewing videos or otherwise experiencing media provided by the content server system 100 in other embodiments.

As described in the remainder of the specification, the content server system 100 and the client devices 110 collectively estimate how many other people (equivalently, "users") are listening to a stream, in addition to the person whose client device 110 is performing the streaming. The person whose device is performing the streaming—and who presumably is listening to the stream—is referred to hereinafter as the "direct listener" for the stream, and the other people estimated also to be listening to the stream on the streaming client device 110 are referred to hereinafter as "inferred listeners" for the stream. The "audience" for a particular stream provided to particular client device 110 consists of the direct listener and the inferred listeners (if any). (Note that the inferred listeners for a stream—or more generally, for content—are limited to those who hear or otherwise experience the content when output at the particular client device. Thus, for example, the inferred listeners for content output at a particular client device do not also include those hearing the content output by a different client device at a different location, such as those in another city.) For example, if there were five friends listening together to a stream that one of them initiated on his device, there would be one direct listener and four inferred listeners (presuming that the estimation techniques accurately identified all four of the other friends). Thus, in this example, the estimated audience size would be five: one direct listener and four inferred listeners. An advertisement provided to an entire audience defined by a stream results in one "direct impression" corresponding to the direct listener, and one "indirect impression" for each inferred listener. In the above example, for instance, providing an advertisement audible to the entire audience would result in one direct impression and four indirect impressions.

The client devices 110 are computing devices such as smartphones with an operating system such as ANDROID or APPLE IOS, tablet computers, laptop computers, desktop computers, electronic stereos in automobiles or other vehicles, or any other type of network-enabled device on which digital content may be listened to or otherwise experienced. Typical client devices 110 include the hardware and software needed to input and output sound and images (e.g., speakers and microphone), connect to an electronic network (e.g., via Wifi and/or 4G or other wireless telecommunication standards), determine the current geographic location of the client devices (e.g., a Global Positioning System (GPS) unit), and/or detect motion of the client devices (e.g., via motion sensors such as accelerometers and gyroscopes).

The client devices 110 may have an application 111 that allows interaction with the content server system 100. For example, the application 111 could be a browser that allows a user of the client device 110 to obtain content by browsing a web site of the content server system 100. As another example, the application 111 could be a dedicated application specifically designed (e.g., by the organization responsible for the content server system 100) to enable interactions with the content server system 100 and its content. The application 111 on a particular client device 110 may be associated with a user of the client device 110 (e.g., via a one-time registration, or a username and password pair or other credentials). When the application 111 is associated with a user, the application can store or otherwise gain access to the user's past listening history, demographic data about the user (either expressly provided by the user, or inferred based on factors such as listening history, geographic location, name, and the like) and use this information to provide content and advertisements that are most likely to be appreciated by that particular user. In addition to allowing a user to explicitly obtain content from the content server system 100, the application 111 may also implicitly provide the content server system 100 with data about status and use of the client device 110, such as its network ID, geographic location, physical movement, and/or sound input, although in some embodiments the user of the application may elect to disable this feature.

The content server system 100 and the client devices 110 are connected via a network 140. The network 140 may be any suitable communications network for data transmission. The network 140 uses standard communications technologies and/or protocols and can include the Internet. In another embodiment, the network 140 includes custom and/or dedicated data communications technologies.

The client device 110 and content server system 100 are now described in more detail with respect to FIGS. 2 and 3, below.

Figure 2A:
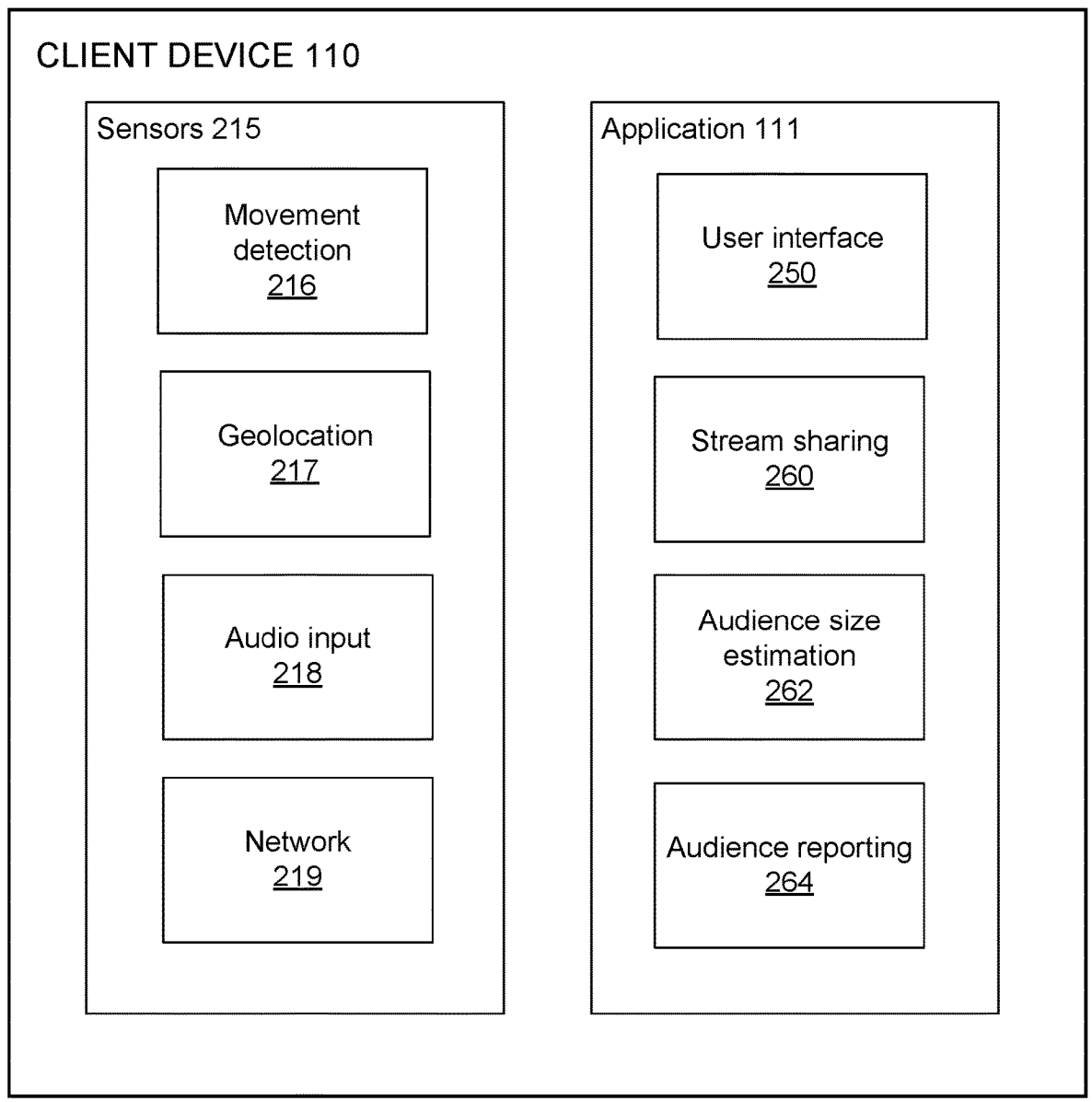
FIG. 2A is a high-level block diagram illustrating a detailed view of a client device of FIG. 1, according to one embodiment.

FIG. 2A is a high-level block diagram illustrating a detailed view of a client device 110 of FIG. 1, according to one embodiment.

A client device has a set of sensors 215 that collect data associated with properties of the client device 110, such as data about the physical environment or state of the client device. Different types or models of client devices may have different sensors. Illustrated in the embodiment of FIG. 2 are a set of sensors 215 particularly appropriate for smartphone client device, though it is appreciated that other client devices may have different sensors.

The illustrated sensors 215 include a movement detection sensor 216, which detects properties of movement of the client device such as speed, acceleration, or direction. The movement detection sensor 216 may include accelerometers or gyroscopes, for example. Another illustrated sensor is the geolocation sensor 217, which determines a particular geographic location of the client device 110, such as coordinates provided by Global Positioning System (GPS) or other geographic location systems. Another illustrated sensor is the audio input sensor 218, such as a microphone, which detects and measures sound. Another illustrated sensor is a network sensor 219, which identifies a network(s) that the client device 110 is currently using for communication, such as a Wifi network, or a 4G other telecommunication network.

Figure 2B:
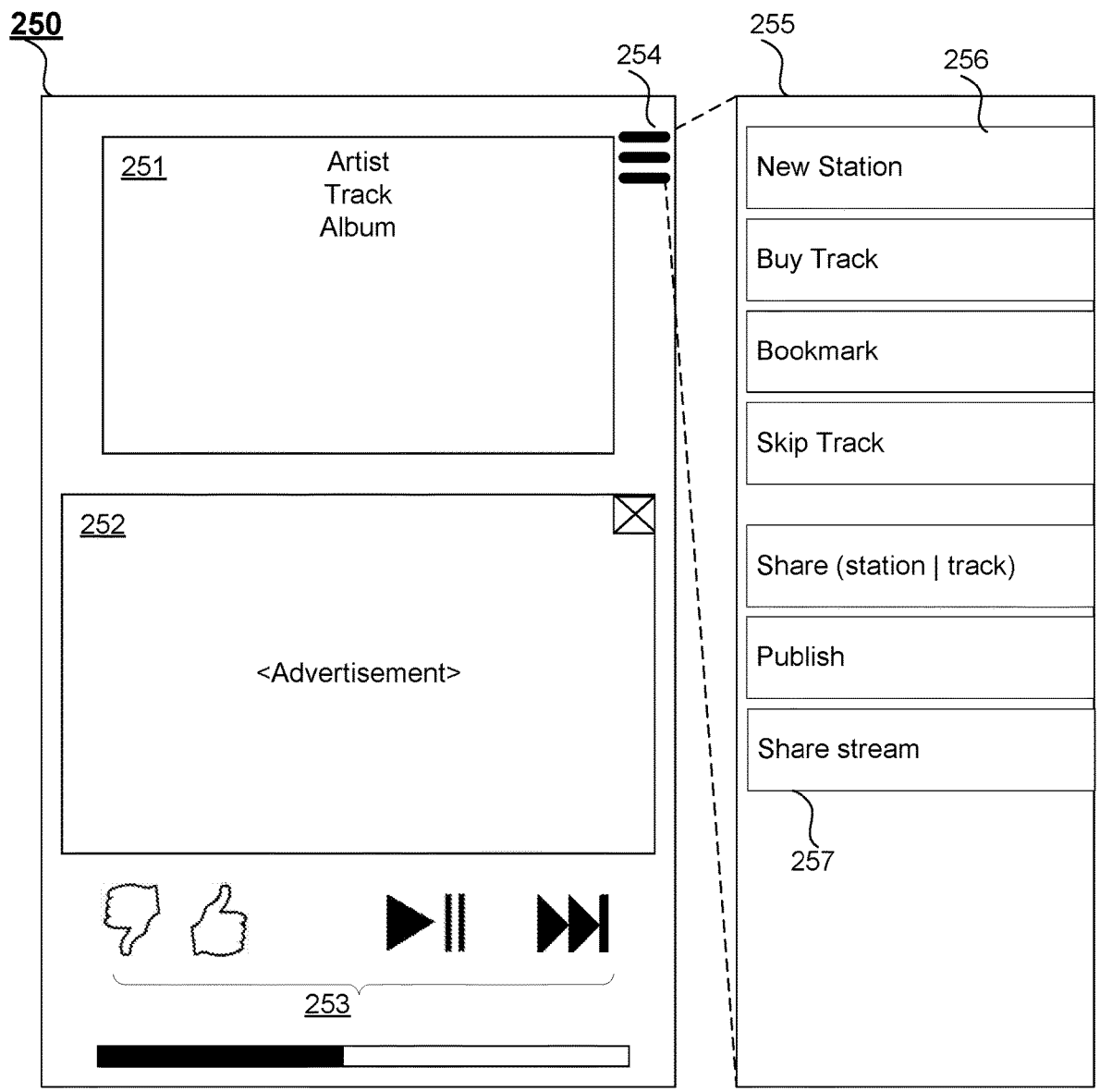
FIG. 2B is an example user interface provided by the application of FIGS. 1 and 2A, according to one embodiment.

The client device 110 may also include an application 111 specifically designed to operate with the content server system 100. For example, in one embodiment the application includes a user interface 250 for interacting with an audio stream, as illustrated in FIG. 2B. The example user interface 250 includes a description area 251 providing information on a currently-playing song, an optional image advertisement 252, controls 253 for registering appreciation for, or dislike of, the song currently playing, and to pause/play or skip the current song. The example user interface 250 also includes a set of options 255 (shown in response to selection of popup control 254) that include an option 256 to request an audio stream that includes songs (tracks) associated with a particular artist, genre, or the like, and an option 257 to share a stream with other nearby users of the content server system 100 so that the other users can also (for example) react to the currently-playing song, such as registering appreciation for, or dislike of, the song, sharing the song, bookmarking the song, or the like.

Returning again to FIG. 2A, in some embodiments the application 111 includes a stream sharing module 260 that, when requested by a user (e.g., via the option 257 of FIG. 2B), makes the currently-playing stream accessible to others, and (for applications 111 on client devices not currently streaming) allows their users to interact with the stream. For example, on the client device 110 doing the streaming, the stream sharing module 260 may broadcast the availability of the stream to other client devices 110 using short-range wireless communications; and on client devices located nearby, the sharing module 260 may note the availability of the stream in the user interface, and in response to the user accepting the shared stream, show the playing stream along with controls allowing the user to comment on or otherwise interact with the stream.

In some embodiments, the application 111 also includes an audience size estimation module 262 that estimates (possibly in cooperation with the content server system 100) an actual size of the audience for the stream, including a number of inferred listeners, in addition to the direct listener of the client device 110 receiving the stream from the content server system. Details on the various techniques used by the audience size estimation module 262 are provided below with respect to the operations of FIGS. 5A-5D. The application 111 may use the audience estimation module 262 multiple times while the current audio stream is being provided in order to keep the content server system 100 updated with the most accurate audience size estimation. For example, in one embodiment the audience size estimation module 262 is used directly before an advertisement is inserted into the audio stream; in other embodiments, it may be used at predetermined time intervals, such as every 2 minutes.

In one embodiment, the application 111 also includes an audience reporting module 264 that provides the estimates generated by the audience estimation module 262 to the content server system 100. For example, if the audience estimation module 262 within the application 111 on a particular client device 110 estimates that there are five people in the audience for an audio stream received at that client device, then it notifies the content server system 100 that that particular audio stream/client device has an audience that includes four inferred listeners, in addition to the one direct listener.

Figure 3:
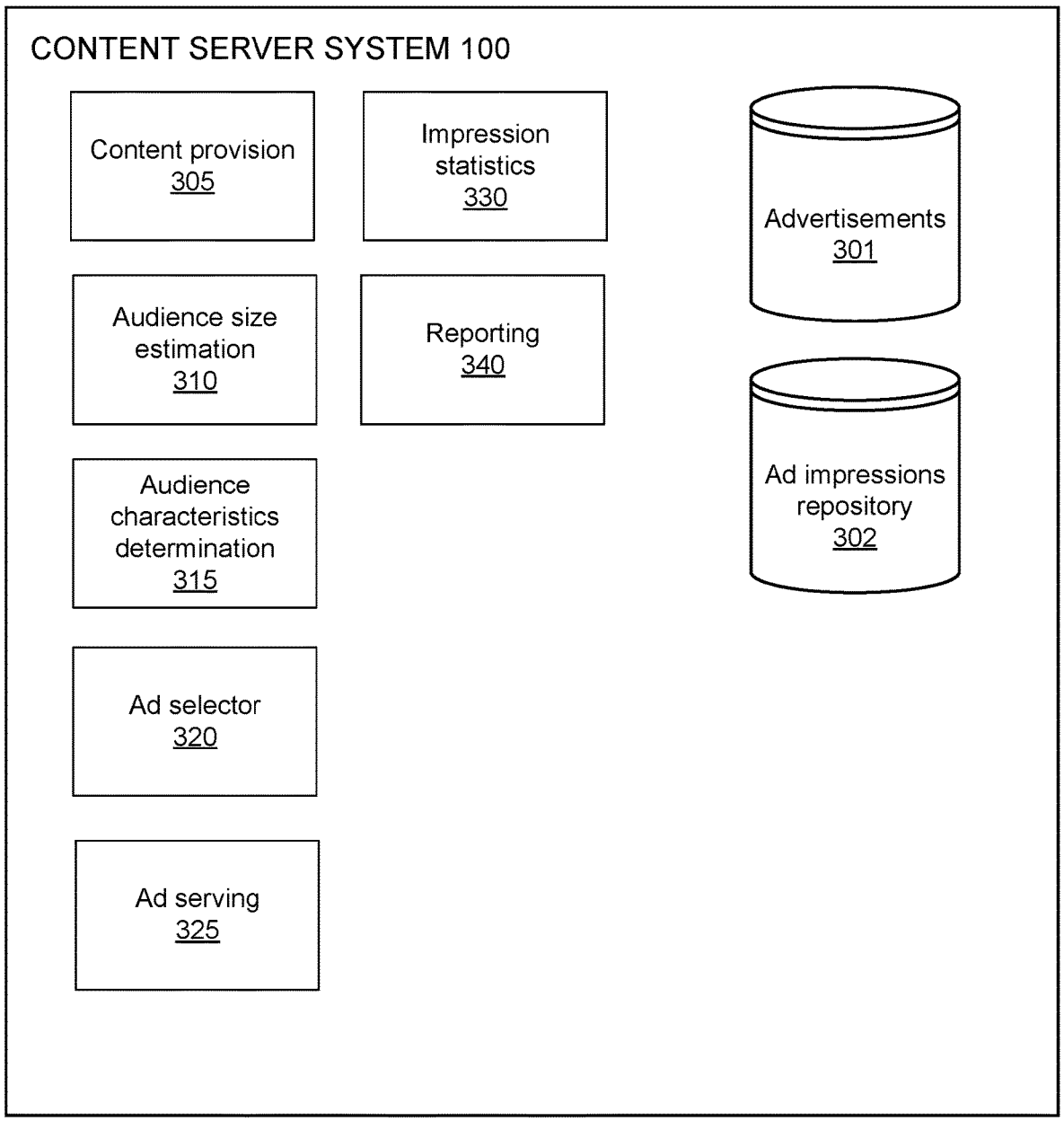
FIG. 3 is a high-level block diagram illustrating a detailed view of the content server system of FIG. 1, according to one embodiment.

FIG. 3 is a high-level block diagram illustrating a detailed view of the content server system 100 of FIG. 1, according to one embodiment.

The content server system 100 includes a content provision module 305 that provides requested content to the application 111 of the requesting client device 110. For embodiments in which the requested content type is audio streams, for example, the content provision module 305 initiates a stream of the requested audio, streaming the audio to the client device 110 over time.

The content server system 100 also includes an audience size estimation module 310 that estimates (possibly in cooperation with the application 111 on the client devices 110) an actual size of the audience for each of the various streams currently being provided, including a number of inferred listeners. Details on the various techniques used by the audience size estimation module 310 are provided below with respect to the operations of FIGS. 5A-5D.

It is appreciated that the various techniques of FIGS. 5A-5D are not exhaustive, and that other techniques, or variations on these techniques, are also possible. For example, in some embodiments other sensor data from the client devices 110 are also taken into account. For instance, in one embodiment sensors such as the status of the audio headphone output are used to determine whether the provided content is truly audible to more than the streaming user, or whether (in contrast) the audio is being provided to an output audible by only one listener. If the audio headphone output indicates that the sound is being output exclusively to headphones, for example, then it is assumed that there are no inferred listeners, since only someone with the headphones would hear the audio. As another example, in some embodiments the status of direct device links such as Bluetooth or similar proprietary protocols is used to infer whether the audio is being provided to an output device (e.g., a home or car stereo) that typically would be audible by multiple people.

The audience estimation module 310 may be used at many different times for a particular stream in order to maintain an accurate audience size estimate. For example, in one embodiment the audience size estimation module 310 is used directly before an advertisement is inserted into the audio stream; in other embodiments, it may be used at predetermined time intervals, such as every 2 minutes.

The content server system 100 also includes an audience characteristics determination module 315 that determines characteristics of the audience as a whole (in addition to its size as estimated by the audience size estimation module 310), based on the characteristics of the individual people in the audience. The characteristics of the direct listener can be obtained using the application 111 of the client device 110 to which the content (e.g., audio stream) is being provided, assuming that the direct listener has registered with the application 111. Additionally, inferred listeners may have client devices 110 with their own applications 111 that are in communication with the content server system 100, even though those applications 111 are not actively being used to stream the audio or otherwise obtain the content. In such a case, the applications 111 of the client devices 110 of the inferred users may be able to provide information about the inferred users.

The characteristics that can be determined include characteristics derived from the client device 110 itself, such as client device type (e.g., screen size and resolution); geolocation (e.g., GPS coordinates) of the client devices 110 of the users in the audience; a more semantically-meaningful description of the geolocation (e.g., "in a private home" or "in a public place"); and current network being used to communicate (e.g., Wifi, or 4G LTE). The characteristics also include information related to use of the content server system 100, such as the past listening history (e.g., songs, artists) of the users of the client devices 110, and demographic data about the users. The demographic data may be provided explicitly by the users when using the applications 111, or it may be inferred from other factors, such as inferring that a particular user is American in response to the user typically listening to English-language programs at locations within the United States.

The content server system 100 additionally includes an ad selector module 320 that selects one or more advertisements to include within the provided content (e.g., an audio stream). In one embodiment, the ad selector module 320 may additionally select advertisements that are presented outside of the provided content, such as display image advertisements presented visually on screens of client devices 110, rather than audio advertisements inserted into audio content. In one embodiment, the advertisements are selected from an advertisements repository 301 to which the various advertisers 120 submit advertisements for potential inclusion within content.

Advertisements which, when output on the client device 110 of the direct listener, can be heard or otherwise experienced by others in the audience (in addition to the direct listener) are referred to as "audience-wide" advertisements, and those that are intended to be experienced only by a single member of the audience at a time are referred to as "individual user" advertisements. For example, audio advertisements played through the speakers of the client device 110 of the direct listener are audience-wide advertisements, and display image advertisements individually selected for, and provided to, the client devices 110 of individual users in the audience are individual user advertisements. Visual advertisements provided to a client device that could have multiple viewers (e.g., a TV screen) may also be considered audience-wide advertisements.

The audience-wide advertisements are selected—based on the audience characteristics provided by the audience characteristics determination module 315—to be appropriate not only for the direct listener to whose client device 110 the content is being provided, but also for the inferred listeners (if any) within the audience for the content that is output by the client device 110. For example, the content server system 100 may select the advertisements based on the language(s) spoken by the members of the audience (both the direct and inferred listeners), whether explicitly specified or inferred; the gender(s) of the members of the audience; any known interests or preferences of the members of the audience; or any other known characteristic of relevance. For example, if the ad selector module 320 determines that there are multiple languages spoken by the audience, it selects advertisements that are in the language of the country to which the content is being provided, since that is the presumed lingua franca generally understood by the audience.

The ad selector module 320 may also use other non-audience-specific factors when selecting the advertisement(s), such as any preferences specified by the advertisers 120 who submitted the ads to the advertisements repository 301 (e.g., some advertisers may only wish their advertisements to be provided to audiences with specified properties); the advertisement mix model of the content server system 100, which specifies the order in which advertisements with different properties (e.g., from different advertisers, with different subject matter) should be provided so as to maximize user interest; and any advertising auction factors, such as preferring advertisements for which the advertisers are willing to pay higher per-impression fees. Another factor that the ad selector may take into account is whether a given advertiser has had its specified minimum number of direct impressions provided yet. For example, assume that a particular advertiser has specified that its advertisements should collectively receive 10,000 direct impressions per month; that those advertisements have only received 8,000 direct impressions thus far; and that it is late in the month, so that it is unlikely that the advertiser's advertisements will receive the specified 10,000 direct impressions by the end of the month. In such an example, the ad selector module 320 may tend to provide advertisements of that advertiser to audiences with large numbers of inferred listeners, so that a larger number of indirect impressions may help to offset the failure of the advertisements to receive the specified number of direct impressions.

If the client devices 110 of the various members of the audience are in communication with the content server system 100, the ad selector module 320 may also select different individual user advertisements for display within the applications 111 of those client devices. For example, in addition to providing an audio advertisement to the client device 110 of the direct listener within an audio stream, the ad selector module 320 may also provide display image advertisements (for example) on the screens of the other client devices, so that those users can see the advertisements while they are listening to the audio stream playing on the client device of the direct listener. Those additional display image advertisements may be selected based on the known characteristics of the respective users, such as their languages, locations, nationalities, prior listening histories, and the like.

The content server system 100 additionally includes an ad serving module 325 that provides the selected advertisements to the client device 110 receiving the content. In embodiments in which the content is streaming audio, for example, the ad serving module 325 inserts audience-wide audio advertisements into the audio stream provided to the client device 110 of the direct listener. The ad serving module 325 content system may also provide additional individual user advertisements to audience members other than the direct listener, e.g., by sending display image advertisements to any client devices 110 of the inferred listeners that are in communication with the content server system 100.

The content server system 100 additionally includes an impression logging module 330 that adds additional impression counts (stored in an ad impressions repository 302) based on the providing of the selected advertisements and the audience size estimation. The impression counts reflect the number of impressions associated with the providing of an ad to client devices 110, including direct impressions and indirect impressions. For example, the ad impression logging module 330 logs (N+1) additional impressions for each audience-wide advertisement provided to the client device 110 of the direct listener: N indirect impressions (assuming N inferred users were identified), and one direct impression (corresponding to the direct listener). An impression count may be logged in different ways in different embodiments, such as one number for the sum of the direct and indirect impressions, and one for the number of indirect impressions; solely the number of indirect impressions (from which the sum is derivable, given that there will be one indirect impression); or the like. The ad impression logging module 330 also logs one additional impression for each individual user advertisement provided to any of the audience members. Payments to the content server system 100 by the advertisers 120 are then based on the logged impressions in the ad impressions repository 302.

The content server system 100 additionally includes a reporting module 340 that provides a report of advertising statistics to advertisers 120. The report for a given advertiser includes the total number of impressions for the various advertisements of the advertiser over some time period, as logged by the impression logging module 330 when updating the impressions statistics. In one embodiment, the impressions in the report include the total number of impressions (collectively, and/or for individual advertisements), as well as the number of direct and indirect impressions that constitute the total. In various embodiments, the report is provided in response to an explicit request of the advertiser 120 (e.g., logging into an account of the advertiser on the content server system in order to see a report of advertisement statistics in a user interface); in other embodiments, the report is periodically sent to the advertiser, e.g., in a summary email.

Figure 4:
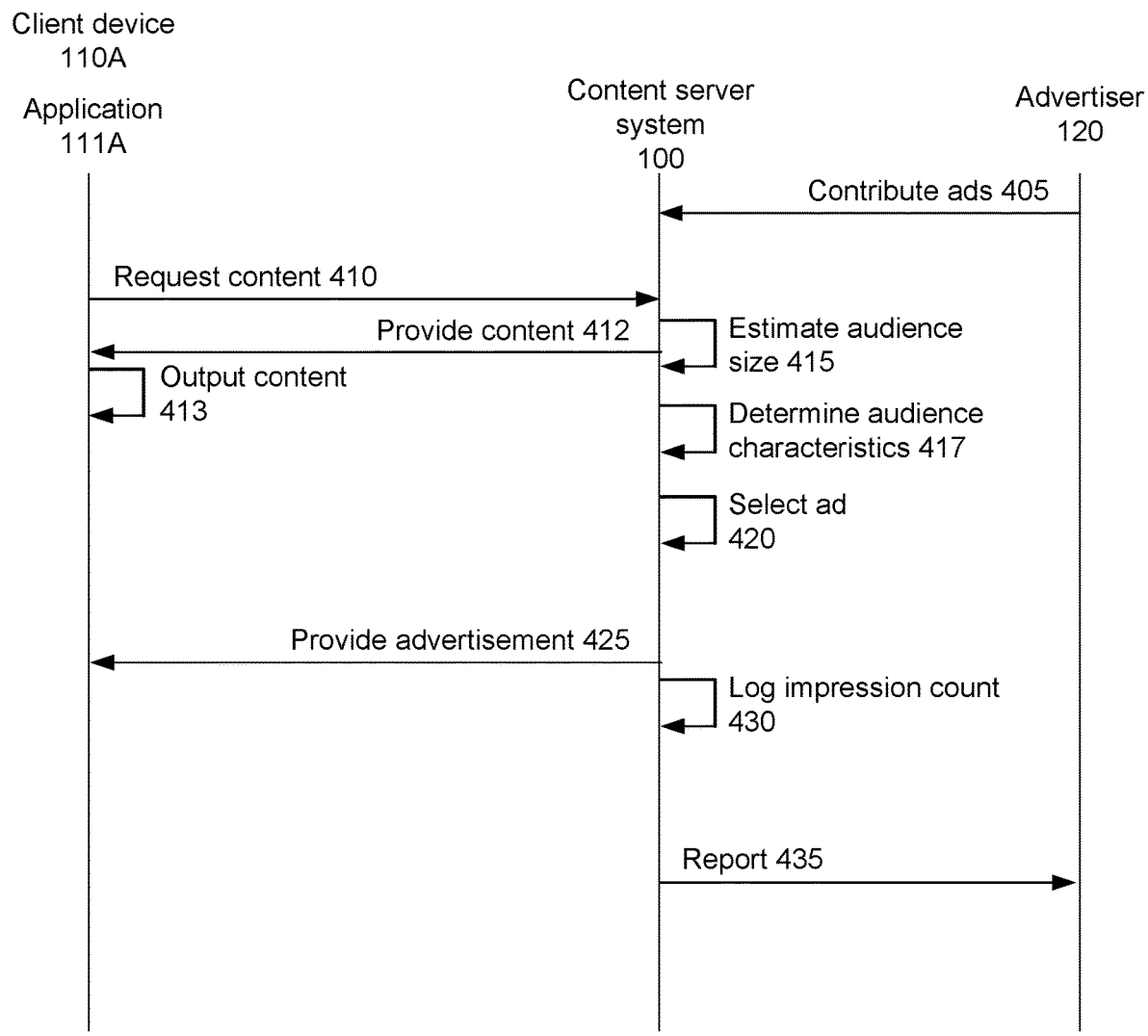
FIG. 4 is a sequence diagram that illustrates interactions of the server system, client device, and advertiser of FIG. 1 during the overall process of providing, serving, tracking, and reporting on advertisements, according to one embodiment.

FIG. 4 is a sequence diagram that illustrates interactions of the server system 100, client device 110, and advertiser 120 during the overall process of providing, serving, tracking, and reporting on advertisements, according to one embodiment.

Advertisers 120 contribute 405 advertisements to the content server system 100 for potential inclusion by the content server system within the content (e.g., streamed audio) provided to clients, and the content server system stores the advertisements in an advertisements repository 301 of candidate advertisements. In other embodiments, the content server system 100 does not maintain an ad repository, but instead dynamically obtains advertisements from the advertisers 120 at the time the ads are served. The various advertisers may specify, as part of agreements with organization responsible for the content server system 100, that their advertisements must (either individually or collectively) be served to users some given minimum number of times during a given time period, e.g., at least 10,000 impressions per month for the advertisements taken collectively.

The advertisements may be of different data formats, as appropriate for the way in which the advertisements are output to users. For example, in one embodiment in which the primary provided content is streamed audio, the data formats of the advertisements include audio advertisements, which are inserted into the audio stream and output through the speakers of the client device 110 that receives the audio stream, and image advertisements, which are displayed by the application 111 on the screen of that client device.

An application 111 of a client device 110 sends a request 410 for content to the content server system 100, such as to initiate an audio stream. For example, the application 111 might request content explicitly requested by the user (e.g., a particular song, or songs associated with a particular artist), or automatically request content that a user registered with the application 111 is expected to appreciate (e.g., a particular song, or songs associated with a particular artist, that the user selected in the past, or songs determined to be similar in some way to those selected in the past). The content server system 100 accordingly provides 412 the content to the client device 110, such as by beginning to stream the requested audio. The application 111A accordingly outputs 413 the content in a manner appropriate for the type of content. For example, for audio stream content, the application 111A causes the client device 110A to send the audio of the stream to its speakers or other sound output port or device.

During some time period after the request 410 for content, the content server system 100 identifies attributes of the audience of the provided content. In particular, the content server system 100 estimates 415 a size of the audience of the provided content, including estimating a number of inferred listeners. In some embodiments, the content server system 100 itself estimates 415 the size of the audience by receiving data, such as sensor data, from the client devices 110 and performing the estimation based on the received data. In other embodiments, the estimation 415 is accomplished by applications 111 of the client devices 110 locally performing audience size estimation, and the content server system 100 receiving those estimates.

Examples of different techniques for estimating the size of the audience are provided below with respect to FIGS. 5A-5D. Although not depicted in FIG. 4, the estimation 415 may be performed many times for particular requested content (e.g., during the existence of a requested audio stream), such as directly before the content server system provides an advertisement to client devices 100, or at predetermined time intervals.

The content server system 100 also determines 417 characteristics of the audience as a whole (in addition to its size), as described above with respect to the audience characteristics module 315 of FIG. 3.

The content server system 100 also selects 420 one or more advertisements to include within the provided content (e.g., an audio stream), as discussed above with respect to the ad selector module 320 of FIG. 3.

The content server system 100 then provides 425 the selected advertisements, as described above with respect to the ad serving module 325 of FIG. 3.

The content server system 100 also logs 430 an impression count based on the providing of the selected advertisements at step 425 and the audience size estimated at step 415, as discussed above with respect to the ad impression logging module 330 of FIG. 3.

In one embodiment, the content server system 100 also provides 435 a report of the advertising statistics to the advertiser, as discussed above with respect to the reporting module 340 of FIG. 3.

FIGS. 5A-5D illustrate the interactions involved in a number of different techniques for estimating the number of inferred listeners in an audience as in step 415 of FIG. 4, according to various embodiments. The techniques are performed by the audience size estimation modules 310 of the content server system 100 and/or 262 of the applications 111.

Figure 5A:
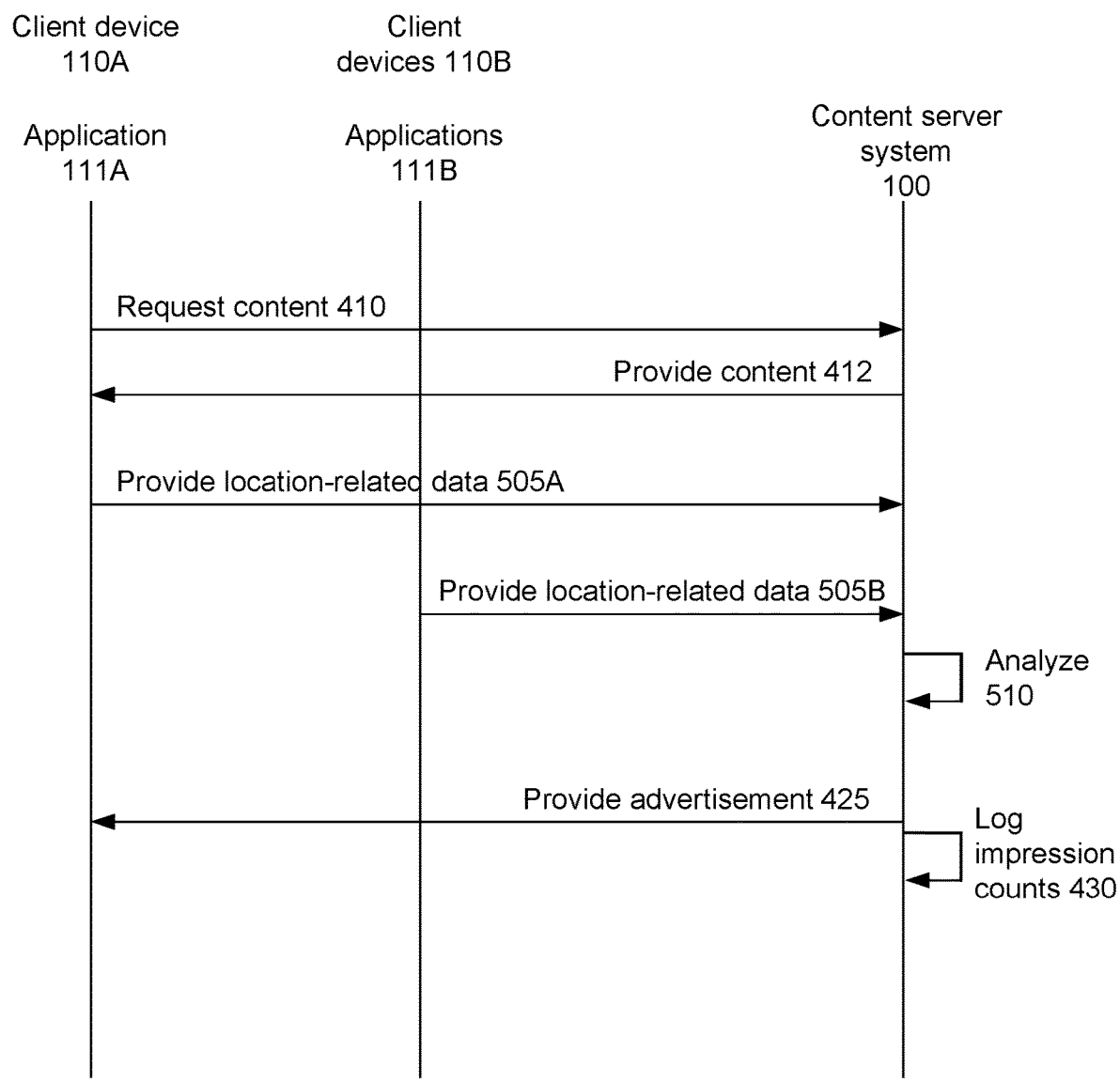
FIGS. 5A-5D illustrate the interactions involved in a number of different techniques for estimating the number of inferred listeners in an audience, according to various embodiments.

FIG. 5A illustrates interactions involved when estimating the number of inferred listeners based on similar location-related data of client devices, according to one embodiment. Content (e.g., an audio stream) is provided 412 to a first client device 110A with a first application 111A, e.g., at the request of a first user. Additionally, one or more other, different users have additional client device 110B (e.g., smartphones) with corresponding one or more additional applications 111B, although they are not currently receiving the content provided to the first client device 110A.

In one embodiment, the applications 111A, 111B all provide 505 the content server system 100 with location-related data indicating the locations of the client devices, such as geolocation information (e.g., GPS coordinates), and/or network-related data (e.g., identifier of a Wifi or other local network to which the devices are connected). The content server system 100 then analyzes 510 the location-related data provided by the applications 111A, 111B, and determines based on the data that their respective client devices 110A, 110B are likely in sufficiently close proximity that the users of those client devices can all hear the content when output by the first client device and thus constitute a single audience. In one embodiment, the analysis 510 includes determining that the geolocation information indicates locations within some threshold distance of each other (e.g., 25 meters) that is sufficiently small that the sound of the audio stream produced by the client device 110A would likely be audible to users of the client devices 110B. In one embodiment, the analysis 510 additionally and/or alternatively includes determining that network-related data indicate that the devices 110A, 110B are on the same local network, and hence are likely close enough that their respective users would constitute a single audience.

In another embodiment (not illustrated in FIG. 5A), the analysis 510 is performed locally by the applications 111, rather than by the server system. For example, the applications 111 could locally broadcast their location-related data, and the application 111A of the first client device 110A receiving the audio stream could receive the location-related data of the applications 111B. The application 111A could then determine (using the same analysis as that described directly above as being performed by the content server system 100) that the other client devices 110B are sufficiently close that their users should be included within a single audience. The application 111A would then send a notification to the server system 100 that there are other inferred listeners (i.e., the users of the other client devices 110B) associated with the audio stream being provided to the first client device 110A.

With the audience size estimated based on the analysis 510, the content server system 100 provides 425 an advertisement and logs 430 the impression counts associated with the advertisement, as described above with respect to FIG. 4.

Figure 5B:
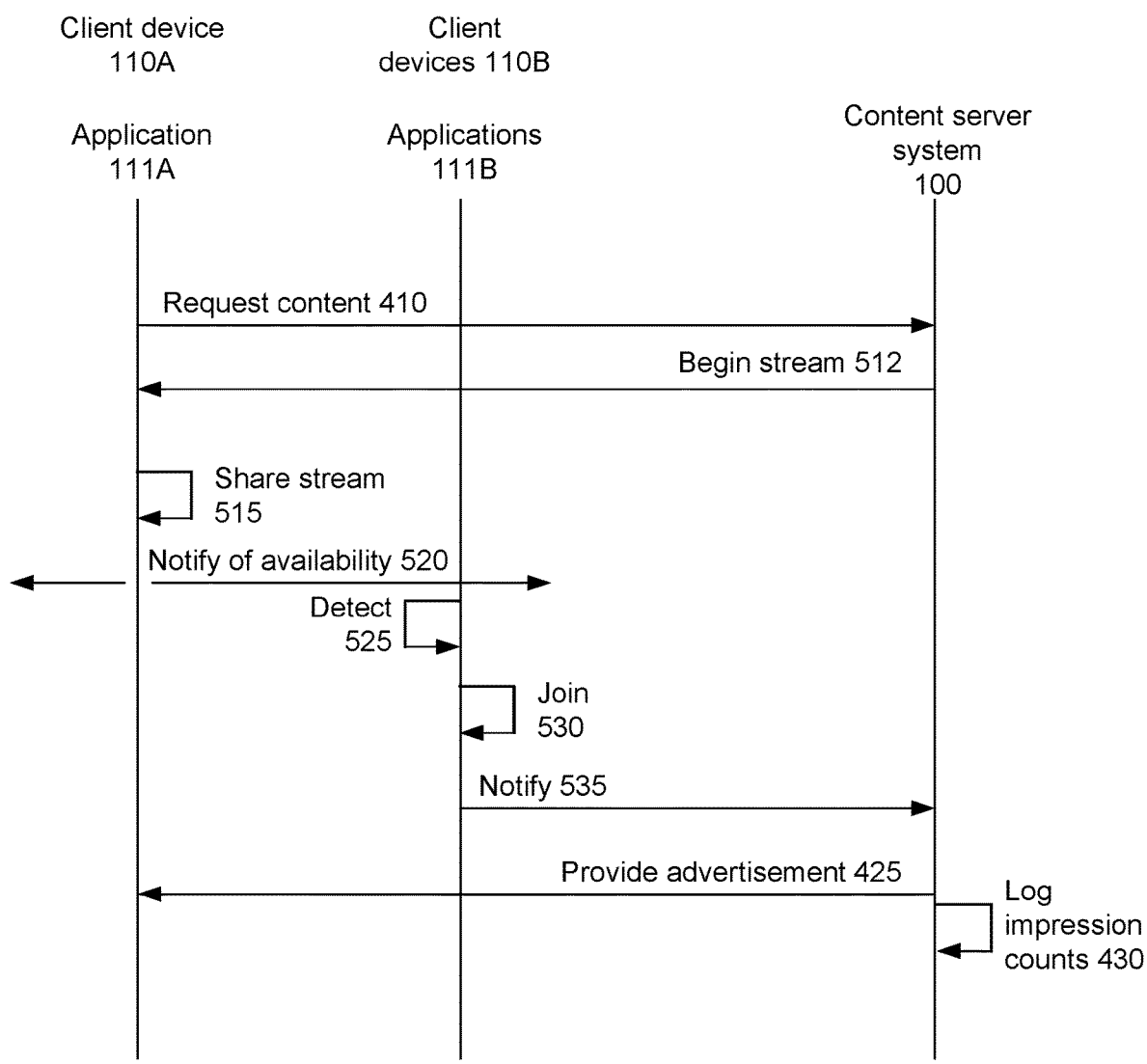

FIG. 5B illustrates interactions involved when estimating the number of inferred listeners based on an explicit sharing of a stream, according to one embodiment. A first application 111A of a first client device 110A makes a request 410 for a content (e.g., audio) stream, e.g., at the request of a first user of the first client device, and the server system begins 512 sending the stream to the application 111A. Additionally, one or more other, different users have additional client devices 110B with corresponding applications 111B, although they are not currently receiving the content provided to the first client device 110A.

The first user, knowing that the other users are nearby and listening to the same stream, and wishing the second users to be able to interact with the stream, explicitly requests 515 sharing the stream with other nearby users (e.g., using the option 257 of FIG. 2B). As a result, the application 111A causes the client device 110A to send a message (e.g., via broadcast) to any nearby client devices 110 notifying 520 the client devices that the stream is available for use by others.

The applications 111B of the other client devices 110B detect 525 the message and inform their corresponding users of the availability of the stream. For example, in one embodiment the applications 111B update their user interfaces to include a description of the stream, such as a username or other identifier of the first user (the "owner" of the stream) and/or of the client device 110A which is receiving the stream. The other users then elect to join 530 the stream, e.g., using a user interface provided by the applications 111B for that purpose (such as a "Join" option associated with a description of the stream). In one embodiment, joining the stream causes the applications 111B to supplement their user interfaces with controls related to the stream, such as options to indicate approval (e.g., a "thumbs up" control) of the stream or of a song within the stream, to share the stream, and the like.

In response to the additional users joining the stream, the applications 111B accordingly notify 535 the server system 100 that there are inferred listeners associated with the stream. Accordingly, when the server system 100 provides 425 an advertisement, it logs 430 the impression counts for the advertisement to include the inferred listeners (i.e., the additional users), as well as the direct listener (the first user).

It is appreciated that the operations of FIG. 5B could be done by different parties than is illustrated, as would be understood by one of skill in the art. For example, rather than directly notifying 535 the content server system 100 of the additional indirect listener, the applications 111B could notify the client application 111A that the users have joined, and the application 111A could update its user interface to reflect the additional users and could notify 535 the content server system 100.

Figure 5C:
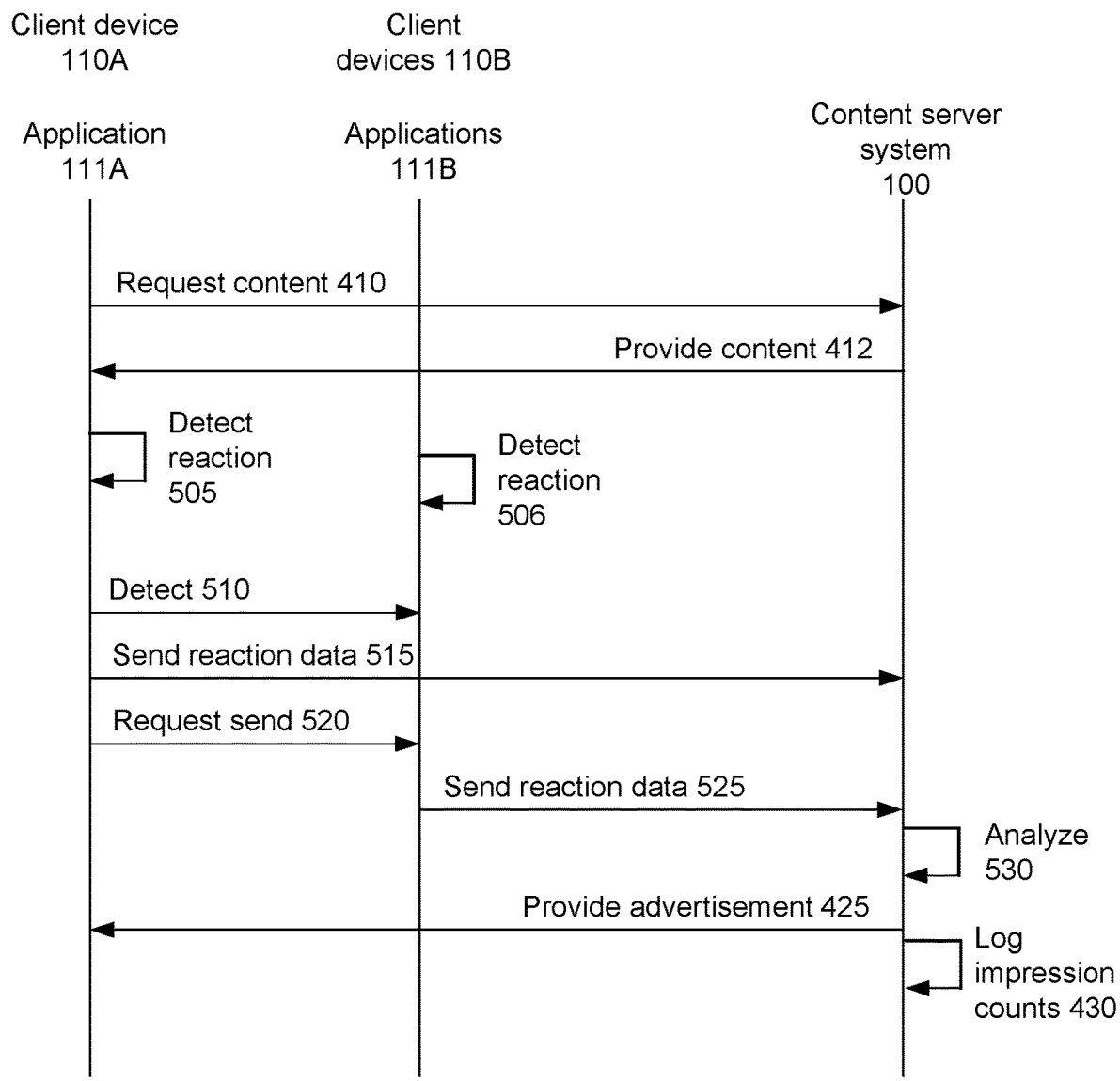

FIG. 5C illustrates interactions involved when estimating the number of inferred listeners based on analysis of user reactions, according to one embodiment. A first application 111A of a first client device 110A (e.g., a smartphone) makes a request for the content (e.g., an audio stream), e.g., at the request of a first user of the first client device, and the server system begins 412 sending the content to the application 111A. Additionally, additional users have additional client devices 110B (e.g., smartphones) with a corresponding additional applications 111B, although they are not currently receiving the content provided to the first client device 110A.

The first and additional users hear the content (e.g., audio stream of music) and react to the content in related ways, such as moving, consciously or subconsciously, in time with the music. Sensors of the client devices 110A, 110B (e.g., accelerometers detecting the movement) measure 505, 506 the reaction, thereby producing reaction data.

In one embodiment, at some point the application 111A detects 510 the presence of the client devices 110B, e.g., by explicitly sending broadcast requests via short-range wireless communication for other instances of the application 111, or by receiving broadcasts from the other applications 111B that note the presence of the client devices 110B. The application 111A sends its own reaction data 515 to the content server system 100, and also requests 520 the applications 111B to send the reaction data of step 506 to the content server. The applications 111B accordingly sends 525 their reaction data to the content server system. The content server system then analyzes 530 the reaction data, determining a degree of similarity between them. For example, the degree of similarity of movement could be determined by comparing the magnitude of the movements and the times at which the movements take place. In one embodiment, if the content server system 100 determines that there is sufficient similarity between the reaction data from the client device 110A and the client devices 110B, then it determines that the users of the various client devices are listening to the same content and therefore that there are inferred listeners (namely, the users of the client devices 110B) for that content.

In a further embodiment, the content server system 100 additionally correlates the reactions described by the reaction data to known information about the provided content. In this embodiment, for example, in order for the second user to be considered an inferred listener, in addition to the reaction second of the second client device 110B having at least a threshold degree of similarity to that of the first client device 110A, the reactions must have some correlation with significant moments in the content, such as movement reaction data occurring within a threshold time of significant changes of volume or pitch in audio stream content (indicating users moving in time to music within the audio stream).

Advertisements are then provided 425 and impression counts logged 430 to reflect the inferred listeners. In another embodiment, analysis is perform by the client devices 110, with the application 111A (or 111B) obtaining the reaction data for all of the client devices 110 and performing the analysis as described above at step 530, and notifying the content server system 100 of a number of inferred users (if any) detected based on the analysis.

Figure 5D:
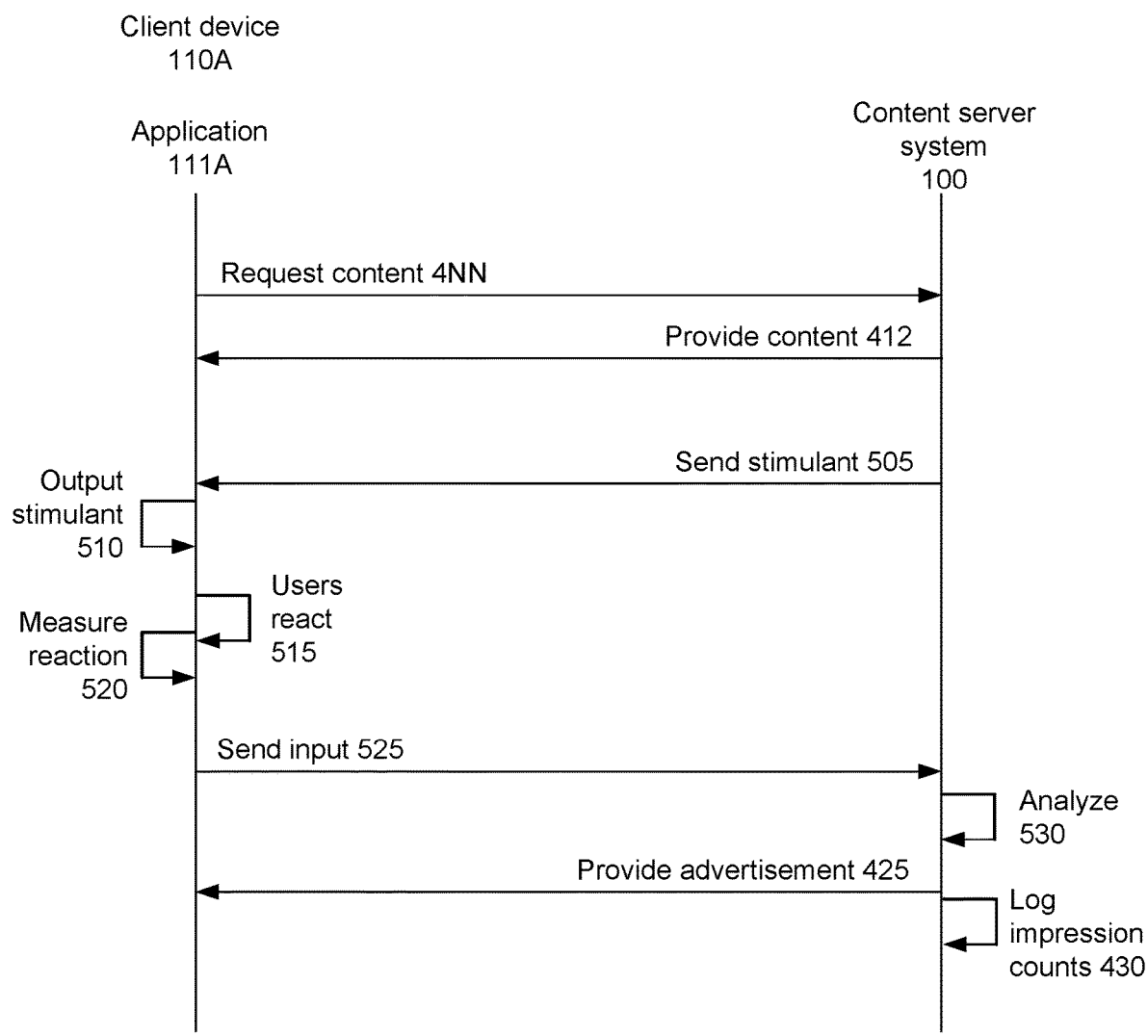

FIG. 5D illustrates interactions involved when estimating the number of inferred listeners based on explicit inducement of a user reaction, even in the absence of more than one client device 110, according to one embodiment. A first application 111A of a first client device 110A (e.g., a smartphone) makes a request for the content (e.g., an audio stream), e.g., at the request of a first user of the first client device, and the server system begins 412 sending the stream to the application 111A.

The content server system 100 sends 505 a stimulant message to the application 111A, the stimulant message intended to elicit a measurable reaction from the first user and from any other nearby listeners. The stimulant message could be an independent message, or part of an advertisement. For example, in one embodiment in which the provided content is an audio stream, the stimulant message is audio inserted into the audio stream that induces the audience members to make an audible vocal response, such as "Cheer if you like X," where X is some product, concept, or the like.

The application 111A accordingly outputs the stimulant message (e.g., playing the audio "Cheer if you like X"). The users in the audience then may react 515, such as by cheering. The application 111A measures 520 the reaction using its sensors, such as its microphone input.

In one embodiment, the application 111A sends 525 the measured reaction data to the content server system 100 for analysis, and the content server system analyzes 530 the reaction data to estimate a number of distinct people represented by the reaction data. For example, in one embodiment the content server system analyzes human voice audio input—such as that resulting from user reactions in the "Cheer if you like X" example—to identify a number of distinct voices, e.g., using auditory scene analysis algorithms such as prediction-driven approaches. The content server system 100 then updates the inferred listeners count associated with the content (e.g., audio stream) to N, assuming that (N+1) distinct people were estimated to be in the audience, one of whom is presumably the direct listener. In a different embodiment, the analysis 530 is performed on the client device 110A by the application 111A, and the application sends to the content server system 100 an updated count of inferred listeners associated with the content based on its analysis 530.

In one embodiment, steps 515 and 520 may take place without prior sending 505 and outputting 510 of a stimulant message. For example, the application 111A may also perform identification of distinct voices in conversations that occur naturally and spontaneously, such as those involved in a conversation between friends.

Figure 6:
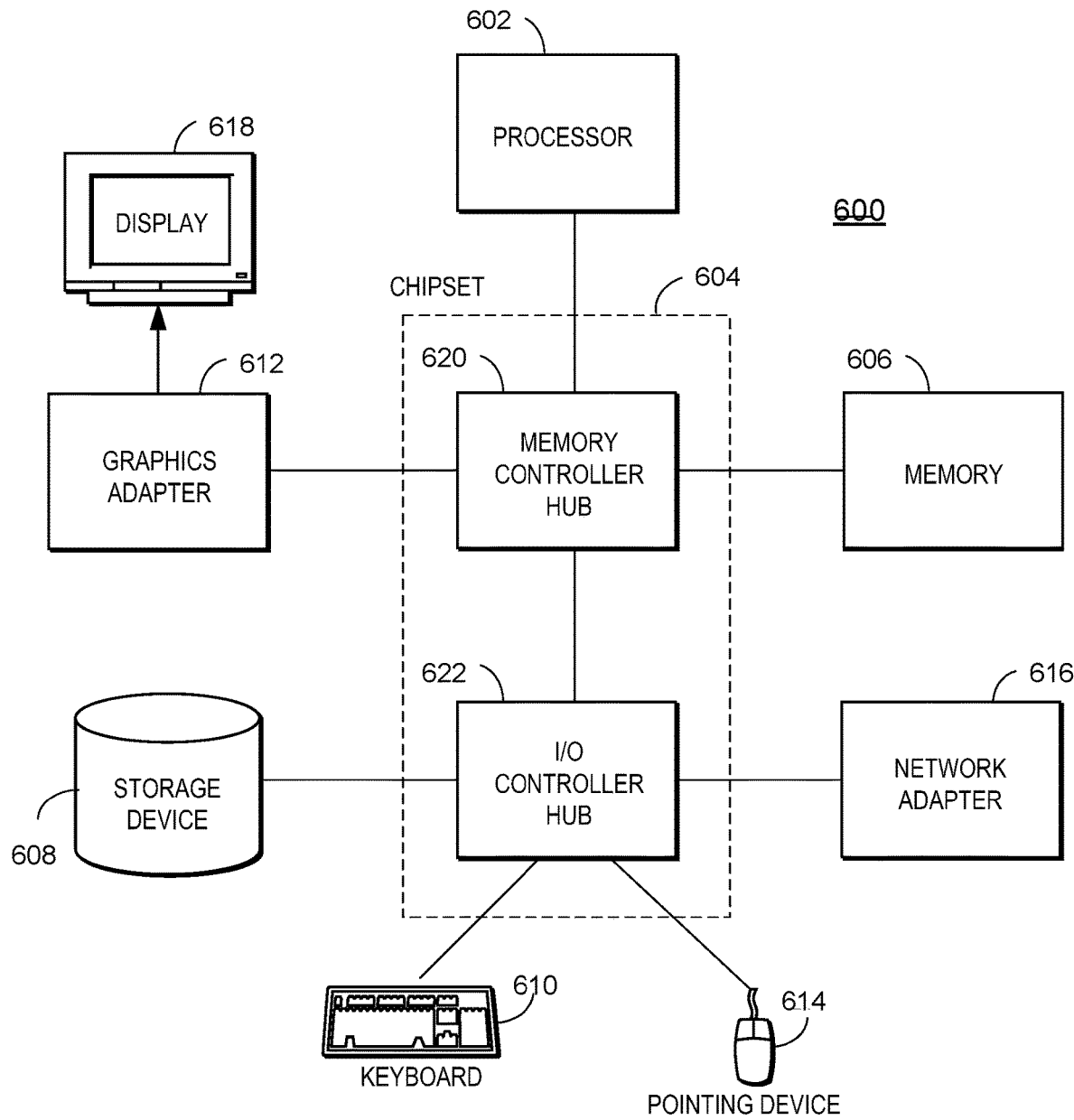
FIG. 6 is a high-level block diagram illustrating physical components of a computer 600 used as part or all of the content server system or client device from FIG. 1, according to one embodiment.

FIG. 6 is a high-level block diagram illustrating physical components of a computer 600 used as part or all of the content server system 100 or client device 110 from FIG. 1, according to one embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer 600. The graphics adapter 612 displays images and other information on the display 618. The network adapter 616 couples the computer 600 to a local or wide area network.

As is known in the art, a computer 600 can have different and/or other components than those shown in FIG. 6. In addition, the computer 600 can lack certain illustrated components. In one embodiment, a computer 600 acting as a server may lack a keyboard 610, pointing device 614, graphics adapter 612, and/or display 618; similarly, a computer 600 acting as a smartphone may lack a keyboard 610 or external pointing device 614, for example. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
   receiving a request for a playlist of songs to be streamed to a streaming client device of a first user;
   providing streaming media comprising the playlist of songs to the streaming client device of a first user, the streaming media having primary content;
   determining whether the streaming client device satisfies a sharing criterion, wherein the sharing criterion describes a manner of output;
   responsive to determining that the streaming client device satisfies the sharing criterion:
      detecting one or more additional client devices that are co-located with the streaming client device based on the one or more additional client devices being within range of a short range wireless communications transceiver of the streaming client device, the one or more additional client devices being other than the streaming client device, the streaming client device and the one or more additional client devices forming a set of client devices, and
      receiving reaction data derived from each client device of the set of client devices, the reaction data reflecting movement of each respective human carrying each respective client device of the set of client devices;
   determining, based on a comparison of the movement of each respective human reflected within the reaction data, that the first user and one or more users of the one or more additional client devices are consuming the same streamed media comprising the playlist of songs where the first user and the one or more users of the one or more additional client devices have respective reaction data reflecting moving in time with a song of the streaming media; and
   selecting additional content to be streamed, the additional content interspersed with the primary content, the selection based on audience characteristics of the first user and the one or more users of the one or more additional client devices.

2. The computer-implemented method of claim 1, wherein determining that the first user of the streaming client device and the one or more users of the one or more additional client devices are consuming the same media comprises:
   correlating the reaction data with known information about the streamed primary content, the reaction data comprising movement data collected by sensors of the streaming client device and by sensors of the one or more additional client devices.

3. The computer-implemented method of claim 2, wherein the known information about the streamed primary content comprises timing of changes in volume or timing of changes in pitch of audio within the streamed primary content.

4. The computer-implemented method of claim 3, wherein determining that the first user of the streaming client device and the one or more users of the one or more additional client devices are consuming the same media comprises:
   determining that particular reactions identified within the reaction data occurred within a threshold time of the changes in volume or pitch of the streamed primary content.

5. The computer-implemented method of claim 1, wherein the audience characteristics are determined based on accessing user profiles associated with the one or more users of the one or more additional client devices.

6. The computer-implemented method of claim 1, wherein the streaming client device receives the streaming media via an application and each of the one or more additional client devices includes a corresponding application.

7. The computer-implemented method of claim 1, wherein determining that the first user of the streaming client device and the one or more users of the one or more additional client devices are consuming the same media comprises:
  determining a degree of similarity among the reaction data derived from each client device of the set of client devices, the reaction data comprising movement data collected by sensors of the streaming client device and the one or more additional client devices.

8. A non-transitory computer-readable medium comprising memory with instructions encoded thereon, the instructions, when executed, causing one or more processors to perform operations, the instructions comprising instructions to:
  receive a request for a playlist of songs to be streamed to a streaming client device of a first user;
  provide streaming media comprising the playlist of songs to the streaming client device of a first user, the streaming media having primary content;
  determine whether the streaming client device satisfies a sharing criterion, wherein the sharing criterion describes a manner of output;
  responsive to determining that the streaming client device satisfies the sharing criterion:
    detect one or more additional client devices that are co-located with the streaming client device based on the one or more additional client devices being within range of a short range wireless communications transceiver of the streaming client device, the one or more additional client devices being other than the streaming client device, the streaming client device and the one or more additional client devices forming a set of client devices, and
    receive reaction data derived from each client device of the set of client devices, the reaction data reflecting movement of each respective human carrying each respective client device of the set of client devices;
  determine, based on a comparison of the movement of each respective human reflected within the reaction data, that the first user and one or more users of the one or more additional client devices are consuming the same streamed media comprising the playlist of songs where the first user and the one or more users of the one or more additional client devices have respective reaction data reflecting moving in time with a song of the streaming media; and
  select additional content to be streamed, the additional content interspersed with the primary content, the selection based on audience characteristics of the first user and the one or more users of the one or more additional client devices.

9. The non-transitory computer-readable medium of claim 8, wherein the instructions to determine that the first user of the streaming client device and the one or more users of the one or more additional client devices are consuming the same media comprise instructions to:
  correlate the reaction data with known information about the streamed primary content, the reaction data comprising movement data collected by sensors of the streaming client device and by sensors of the one or more additional client devices.

10. The non-transitory computer-readable medium of claim 9, wherein the known information about the streamed primary content comprises timing of changes in volume or timing of changes in pitch of audio within the streamed primary content.

11. The non-transitory computer-readable medium of claim 10, wherein the instructions to determine that the first user of the streaming client device and the one or more users of the one or more additional client devices are consuming the same media comprise instructions to:
  determine that particular reactions identified within the reaction data occurred within a threshold time of the changes in volume or pitch of the streamed primary content.

12. The non-transitory computer-readable medium of claim 8, wherein the audience characteristics are determined based on accessing user profiles associated with the one or more users of the one or more additional client devices.

13. The non-transitory computer-readable medium of claim 8, wherein the streaming client device receives the streaming media via an application and each of the one or more additional client devices includes a corresponding application.

14. The non-transitory computer-readable medium of claim 8, wherein the instructions to determine that the first user of the streaming client device and the one or more users of the one or more additional client devices are consuming the same media comprise instructions to:
  determine a degree of similarity among the reaction data derived from each client device of the set of client devices, the reaction data comprising movement data collected by sensors of the streaming client device and the one or more additional client devices.

15. A system comprising:
  memory with instructions encoded thereon; and
  one or more processors, the one or more processors caused to perform operations when executing the instructions, the operations comprising:
    receiving a request for a playlist of songs to be streamed to a streaming client device of a first user;
    providing streaming media comprising the playlist of songs to the streaming client device of a first user, the streaming media having primary content;
    determining whether the streaming client device satisfies a sharing criterion, wherein the sharing criterion describes a manner of output;
    responsive to determining that the streaming client device satisfies the sharing criterion:
      detecting one or more additional client devices that are co-located with the streaming client device based on the one or more additional client devices being within range of a short range wireless communications transceiver of the streaming client device, the one or more additional client devices being other than the streaming client device, the streaming client device and the one or more additional client devices forming a set of client devices, and
      receiving reaction data derived from each client device of the set of client devices, the reaction data reflecting movement of each respective human carrying each respective client device of the set of client devices;
    determining, based on a comparison of the movement of each respective human reflected within the reaction data, that the first user and one or more users of the one or more additional client devices are consuming the same streamed media comprising the playlist of songs where the first user and the one or more users of the one or more additional client devices have respective reaction data reflecting moving in time with a song of the streaming media; and selecting additional content to be streamed, the additional content interspersed with the primary content, the selection based on audience characteristics of the first user and the one or more users of the one or more additional client devices.

16. The system of claim 15, wherein determining that the first user of the streaming client device and the one or more users of the one or more additional client devices are consuming the same media comprises:
   correlating the reaction data with known information about the streamed primary content, the reaction data comprising movement data collected by sensors of the streaming client device and by sensors of the one or more additional client devices.

17. The system of claim 16, wherein the known information about the streamed primary content comprises timing of changes in volume or timing of changes in pitch of audio within the streamed primary content.

18. The system of claim 17, wherein determining that the first user of the streaming client device and the one or more users of the one or more additional client devices are consuming the same media comprises:
   determining that particular reactions identified within the reaction data occurred within a threshold time of the changes in volume or pitch of the streamed primary content.

19. The system of claim 15, wherein the audience characteristics are determined based on accessing user profiles associated with the one or more users of the one or more additional client devices.

20. The system of claim 15, wherein the streaming client device receives the streaming media via an application and each of the one or more additional client devices includes a corresponding application.

\* \* \* \* \*